United States Patent
Thorogood et al.

(12) 
(10) Patent No.: US 12,108,907 B2
(45) Date of Patent: Oct. 8, 2024

(54) USER INTERFACE FOR A COOKING APPLIANCE

(71) Applicant: BREVILLE PTY LIMITED, Alexandria (AU)

(72) Inventors: Michael Thorogood, Alexandria (AU); Emma Larkin, Alexandria (AU); Richard Hoare, Alexandria (AU)

(73) Assignee: BREVILLE PTY LIMITED, New South Wales (AU)

(*) Notice: Subject to any disclaimer, the term of this patent is extended or adjusted under 35 U.S.C. 154(b) by 593 days.

(21) Appl. No.: 17/425,422

(22) PCT Filed: Sep. 30, 2019

(86) PCT No.: PCT/AU2019/051058
§ 371 (c)(1),
(2) Date: Jul. 23, 2021

(87) PCT Pub. No.: WO2020/150766
PCT Pub. Date: Jul. 30, 2020

(65) Prior Publication Data
US 2022/0160169 A1    May 26, 2022

(30) Foreign Application Priority Data
Jan. 24, 2019 (AU) ............... 2019900221

(51) Int. Cl.
*A47J 36/32* (2006.01)
*A47J 37/06* (2006.01)
(Continued)

(52) U.S. Cl.
CPC ........... *A47J 36/32* (2013.01); *A47J 37/0629* (2013.01); *A47J 37/0658* (2013.01); *F24C 7/082* (2013.01); *F24C 15/007* (2013.01); *G05G 1/01* (2013.01)

(58) Field of Classification Search
CPC .... A47J 36/32; A47J 37/0629; A47J 37/0658; F24C 7/082; F24C 15/007; G05G 1/01
See application file for complete search history.

(56) References Cited

U.S. PATENT DOCUMENTS 5,375,921 A    12/1994 Ayres et al.
5,901,696 A *  5/1999 Hansen ................ F24C 7/082
                                                   126/39 M
(Continued)

FOREIGN PATENT DOCUMENTS

CA    2686323 A1    11/2008
CN    101919660 A   12/2010
(Continued)

OTHER PUBLICATIONS

International Search Report for Application No. PCT/AU2019/051058 mailed Dec. 24, 2019.
(Continued)

*Primary Examiner* — Nathaniel E Wiehe
*Assistant Examiner* — Keith Brian Assante
(74) *Attorney, Agent, or Firm* — KDW Firm PLLC

(57) ABSTRACT

A cooking appliance (10) including: a body (12) with a front face; at least one projection (24, 26, 28) extending from the front face, and that is manipulated by a user to control the appliance (10); and an interface (30) releasably mounted on the front face adjacent the projection (24, 26, 28), the interface (30) being mountable in a first orientation or a second orientation, with the orientation to be selected by the user when mounting the interface (30) on the front face.

2 Claims, 6 Drawing Sheets

(51) Int. Cl.
F24C 7/08 (2006.01)
F24C 15/00 (2006.01)
G05G 1/01 (2008.04)

(56) References Cited

U.S. PATENT DOCUMENTS

| | | | | |
|---|---|---|---|---|
| 7,009,147 | B1* | 3/2006 | Schulte | F24C 15/325 |
| | | | | 219/400 |
| 2005/0043076 | A1* | 2/2005 | Lin | A63F 9/24 |
| | | | | 463/9 |
| 2009/0118848 | A1* | 5/2009 | Santinato | F24C 7/082 |
| | | | | 340/6.1 |
| 2011/0290783 | A1 | 12/2011 | Geiger et al. | |
| 2018/0084937 | A1* | 3/2018 | Joo | F24C 7/082 |

FOREIGN PATENT DOCUMENTS

| | | | |
|---|---|---|---|
| DE | 102010063014 A1 | 6/2012 | |
| DE | 102005024934 B4 | 3/2014 | |
| EP | 2260751 A1 | 12/2010 | |
| RU | 2382947 C2 | 2/2010 | |

OTHER PUBLICATIONS

European Search Report and Written Opinion for Application No. EP19911174, mailed Dec. 13, 2022, 8 pages.

* cited by examiner

USER INTERFACE FOR A COOKING APPLIANCE

FIELD

The present invention relates to cooking appliances, and more particularly, but not exclusively to appliances for cooking pizza.

BACKGROUND

Appliances used to cook pizza, such as an oven, provide for circulation of heat around a cavity within which the pizza is being cooked. The oven includes one or more heating elements positioned within the cavity to radiate heat around the cavity to cook the pizza. Typically, the oven is configured to operate in different cooking modes to adjust the heating profile across the pizza.

Disadvantageously, switching between the different cooking modes may require complex and expensive circuitry or may not be user-friendly.

OBJECT

It is an object of the present invention to substantially overcome, or at least ameliorate, one or more of the above disadvantages.

SUMMARY OF INVENTION

There is disclosed herein a cooking appliance including:
a body with a front face;
at least one projection extending from the front face, and that is manipulated by a user to control the appliance; and
an interface releasably mounted on the front face adjacent the projection, the interface being mountable in a first orientation or a second orientation, with the orientation to be selected by the user when mounting the interface on the front face.

Preferably, the interface has an opening through which the projection projects when the interface is mounted on the front face.

Preferably, the projection is a first projection, and the appliance includes a second projection extending from the front face, and the opening is a first opening, and the interface includes a second opening, with the openings arranged so that each of the projections projects through a respective one of the openings.

Preferably, the interface is arranged so that the interface can only be mounted on the front face, with the projections projecting through the openings, in the first orientation or the second orientation.

Preferably, the interface is magnetically attracted to the front face so as to be removably mounted thereon.

Preferably, the interface is provided by a sheet member, the sheet member having a first major surface and a second major surface, with the first major surface being exposed when the interface is arranged in the first orientation, with the second major surface abutting the front face, while the second major surface is exposed when the interface is arranged in the second orientation, with the first major surface abutting the front face.

Preferably, the sheet member is flexible.

There is also disclosed herein a cooking appliance including:

a hollow body providing a cooking cavity, the body having an opening via which product to be cooked can be moved relative to the cavity;
a heating element located in the cavity to deliver radiant energy to cook the product;
a controller operatively associated with the heating element to provide for selective delivery of electric power to the heating element to provide a heating profile across the product, with the controller being configured to switch between a first mode and a second mode to alter the electric power to the heating element to vary the heating profile across the product;
a control projecting from the body and operatively associated with the controller to alter the electric power to the heating element in both the first mode and the second mode of the controller;
an interface releasably mounted to the body, with the interface having an opening through which the control projects when the interface is mounted to the body; and
wherein
the controller is configured to switch from the first mode to the second mode upon mounting the interface to the body.

Preferably, the interface is magnetically attracted to the body so as to be removably mounted thereon.

Preferably, the body includes a sensor operatively associated with the controller, with the sensor being configured to detect a magnetic field of the interface and to switch the controller from the first mode to the second mode upon the sensor detecting the magnetic field of the interface.

Preferably, the sensor is a Hall effect transducer.

DESCRIPTION OF EMBODIMENTS

Figure 1:
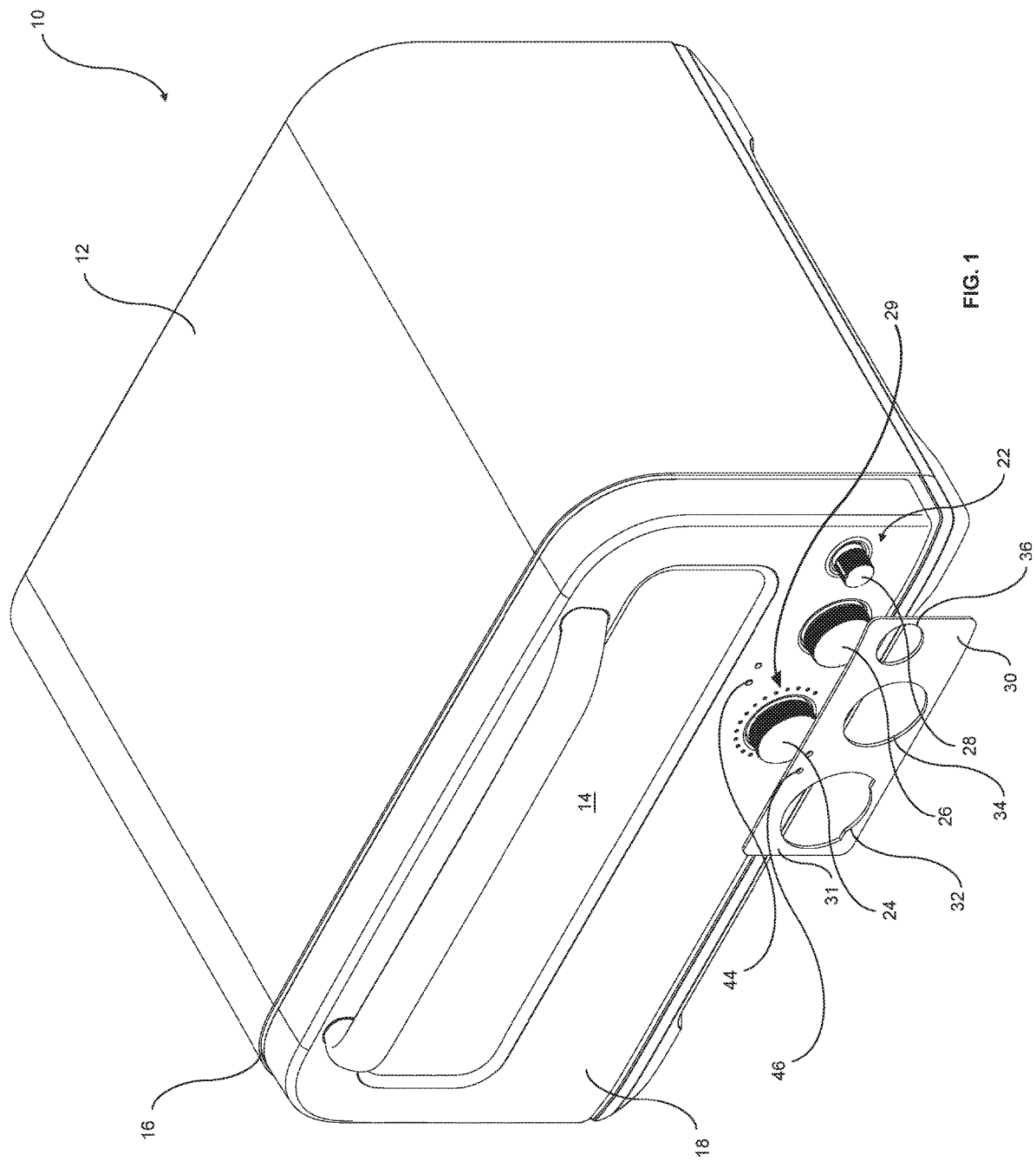
FIG. 1 is a schematic isometric view of a cooking appliance according to an embodiment.

Referring to the drawings there is depicted a cooking appliance 10 configured to cook a pizza (not shown). The appliance 10 includes a generally hollow cuboidal body 12 providing a cooking cavity 14. The body 12 has an opening 16 via which the pizza to be cooked can be moved relative to the cavity 14. The opening 16 is closed by a door 18 which is hinged to the body 12 at a lower portion of the door 18.

The appliance 10 includes a pair of inner and outer upper heating elements (not shown) located in an upper portion of the cavity 14 and a lower heating element (not shown) located in a lower portion of the cavity 14 to deliver radiant energy to cook the pizza.

Figure 2:
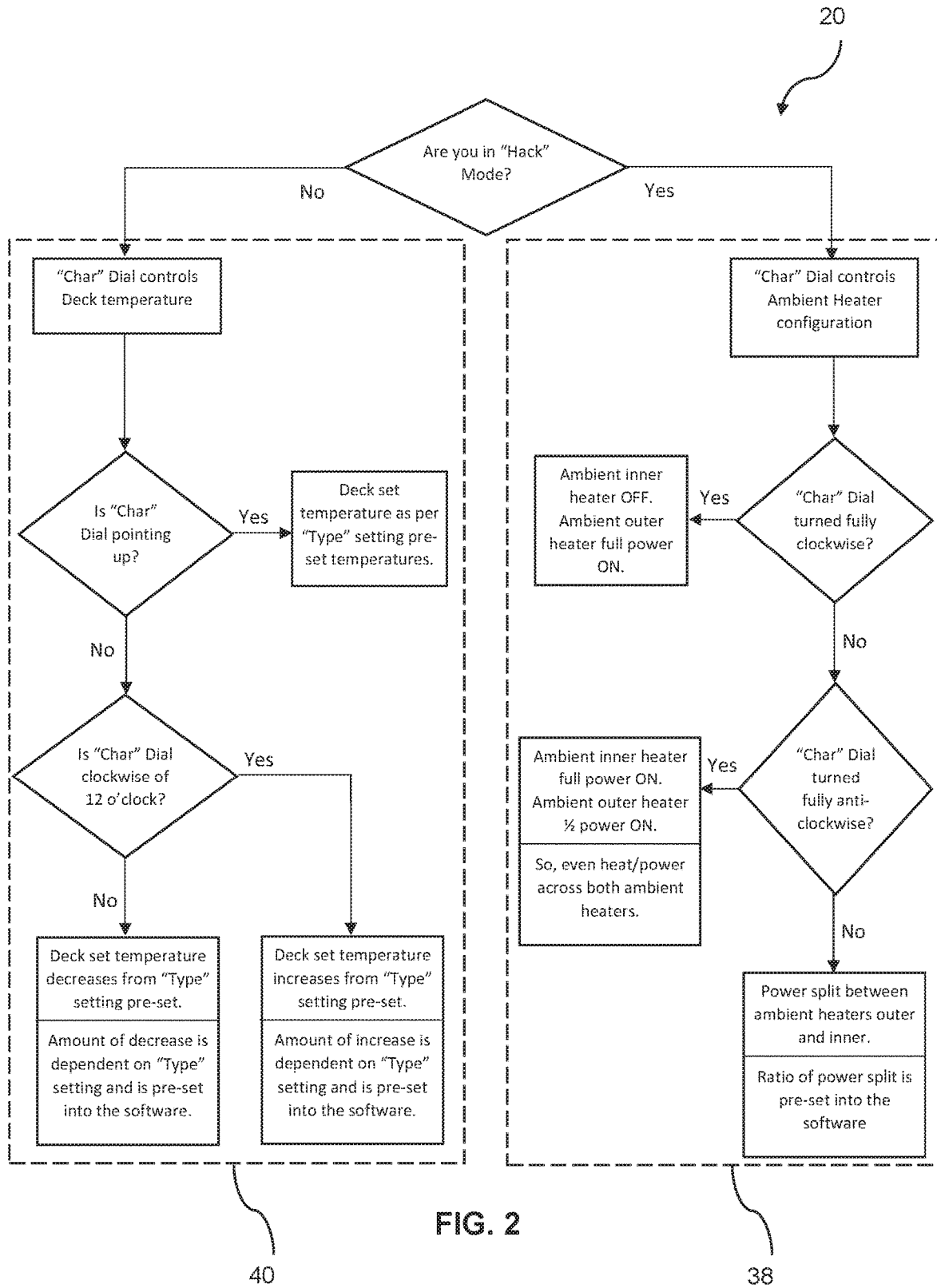
FIG. 2 is a flowchart illustrating an algorithm of the appliance of FIG. 1.

FIG. 2 depicts a controller in the form of an algorithm 20 operatively associated with each of the inner and outer upper heating elements and the lower heating element to provide for selective delivery of electric power to each of the inner and outer upper heating elements and the lower heating element thereby to provide a heating profile across the pizza. Each of the inner and outer upper heating elements is independently controllable by the algorithm 20.

The heating profile across the pizza is controlled by means of a user operable control hub 22 located on a lower portion of the door 18. The control hub 22 is operatively associated with the algorithm 20 to manually and independently alter the electric power and temperature of each of the inner and outer upper heating elements and the lower heating element. The control hub 22 includes a first dial 24, a second dial 26, and a third dial 28 to be manipulated by a user to control the appliance 10. Each of the dials 24, 26, 28 project outwardly from the door 18 so as to have a thickness and a diameter with the diameter of the third dial 28 being smaller than the diameters of the first and second dials 24, 26. Markings or indicators 29 may be provided around each of the dials 24, 26, 28 to guide the user when operating the dials 24, 26, 28.

Figure 3:
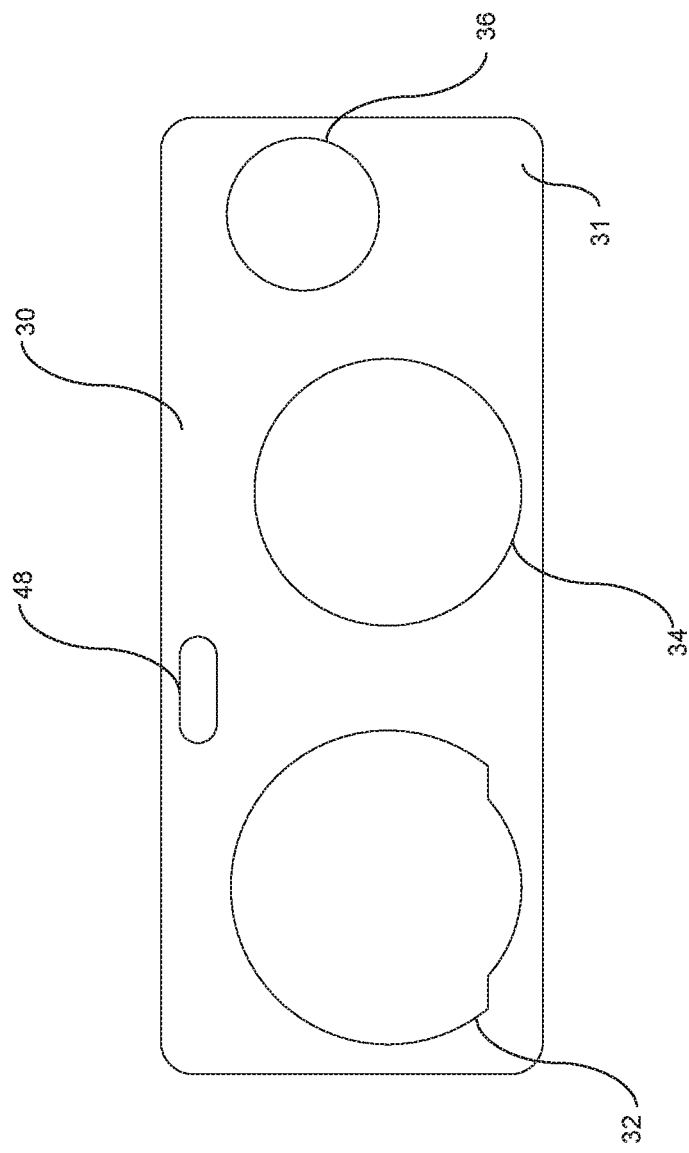
FIG. 3 is a schematic front view of a removable interface of the appliance of FIG. 1.
Figure 4:
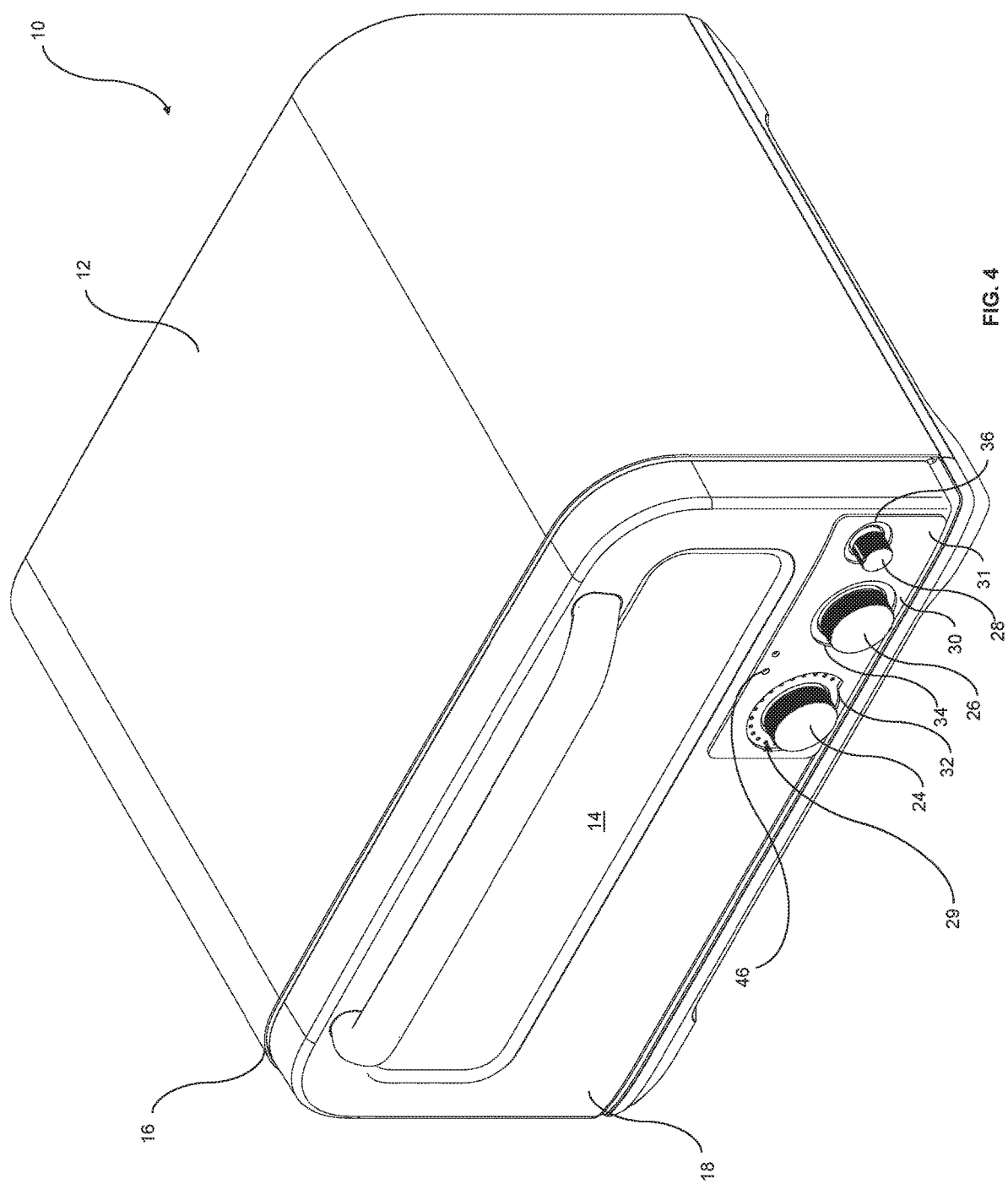
FIG. 4 is a schematic isometric view of the appliance of FIG. 1, shown with the interface mounted to the appliance.

With particular reference to FIGS. 1, 3 and 4, a user interface 30, preferably in the form of a flexible sheet member having a first major surface 31 and a second major surface (not shown), is releasably mounted to a front face of the door 18 adjacent the dials 24, 26 28. The interface 30 is mountable in a first orientation or a second orientation. In the first orientation, the first major surface 31 is exposed whilst the second major surface abuts the front face of the door 18. In the second orientation, the first major surface 31 abuts the front face of the door 18 whilst the second major surface is exposed. The orientation of the interface 30 is selected by the user when mounting the interface 30 on the front face of the door 18.

The interface 30 has first, second and third openings 32, 34, 36 arranged so that each of the dials 24, 26, 28 projects through a respective one of the openings 32, 34, 36 when the interface 30 is mounted on the front face of the door 18. Each of the openings 32, 34, 36 have a diameter corresponding to the diameter of their respective dial. In this way, the interface 30 is arranged so that the interface 30 can only be mounted on the front face of the door 18, with the dials 24, 26, 28 projecting through the openings 32, 34, 36, in the first orientation or the second orientation.

The interface 30 is magnetically attracted to the front face of the door 18 so as to be removably mounted thereon. In this way, the interface 30 may include a magnetic strip on the first and second major surfaces, and the front face of the door 18 may be comprised of a ferromagnetic material such as stainless steel. Although, it will be appreciated that the first and second major surfaces may be entirely magnetised.

Referring back to FIG. 2, the algorithm 20 is configured to operate in a first mode 38 and a second mode 40. A switch (not shown) is mounted to the body 12 and is operatively associated with the algorithm 20 to switch the algorithm 20 between the first mode 38 and the second mode 40. Alternatively, arranging a specific combinational rotational order of the dials 24, 26, 28 and pressing dial 24 (or dials 26, 28 may also be pushed in) causes the algorithm 20 to switch between the first and second modes 38, 40, thus eliminating a need for the switch.

In the first mode 38 of the algorithm 20, the first dial 24 is configured to control the temperature of the lower heating element; the second dial 26 is configured to control the temperature of the inner and outer upper heating elements; and the third dial 28 is configured to control the electric power of only the inner and outer upper heating elements. Essentially, the third dial 28, whilst operating in the first mode 38, provides fine tuning to crusting the pizza, even cooking across the whole of the pizza, or general control over the cooking of a central portion or crust of the pizza.

In the second mode 40 of the algorithm 20, the first dial 24 is configured to control a timer of the inner and outer upper heating elements and the lower heating element; the second dial 26 is configured to control a "type" setting of the appliance 10 (for example, the "type" can be "thick pizza", "thin pizza", or "frozen pizza") to provide a range of pre-set timing intervals and temperatures of the inner and outer upper heating elements and the lower heating element to suit the user's particular needs; and the third dial 28 is configured to control the temperature of the lower heating element. Essentially, the third dial 28, whilst operating in the second mode 40, provides fine control for the temperature of the lower heating element in the event that the pre-set temperature settings of the second dial 26 are not completely accurate for the user's particular needs.

Figure 5:
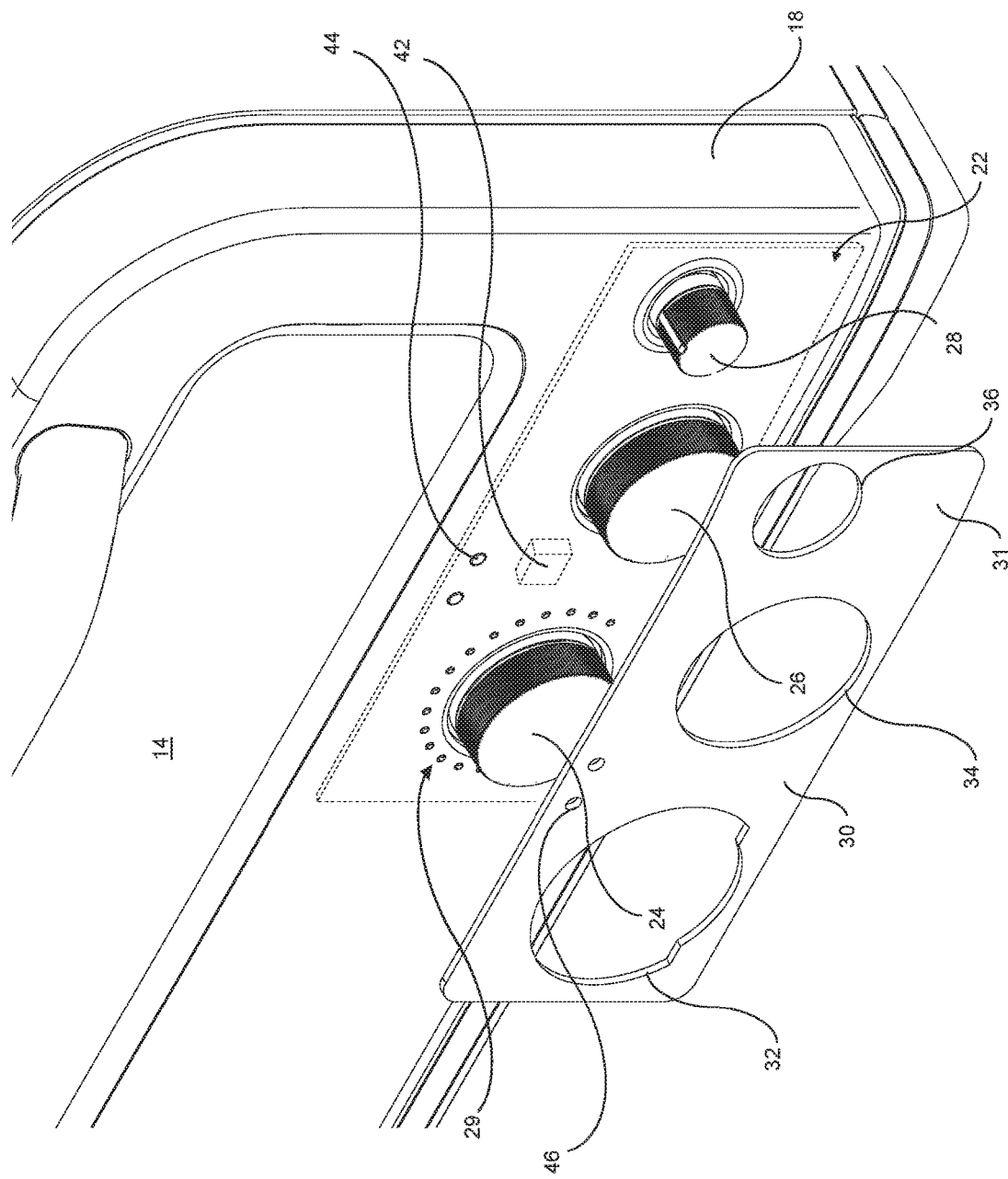
FIG. 5 is a schematic enlarged isometric view of the appliance of FIG. 1, shown with a sensor of the appliance to detect the interface.
Figure 6:
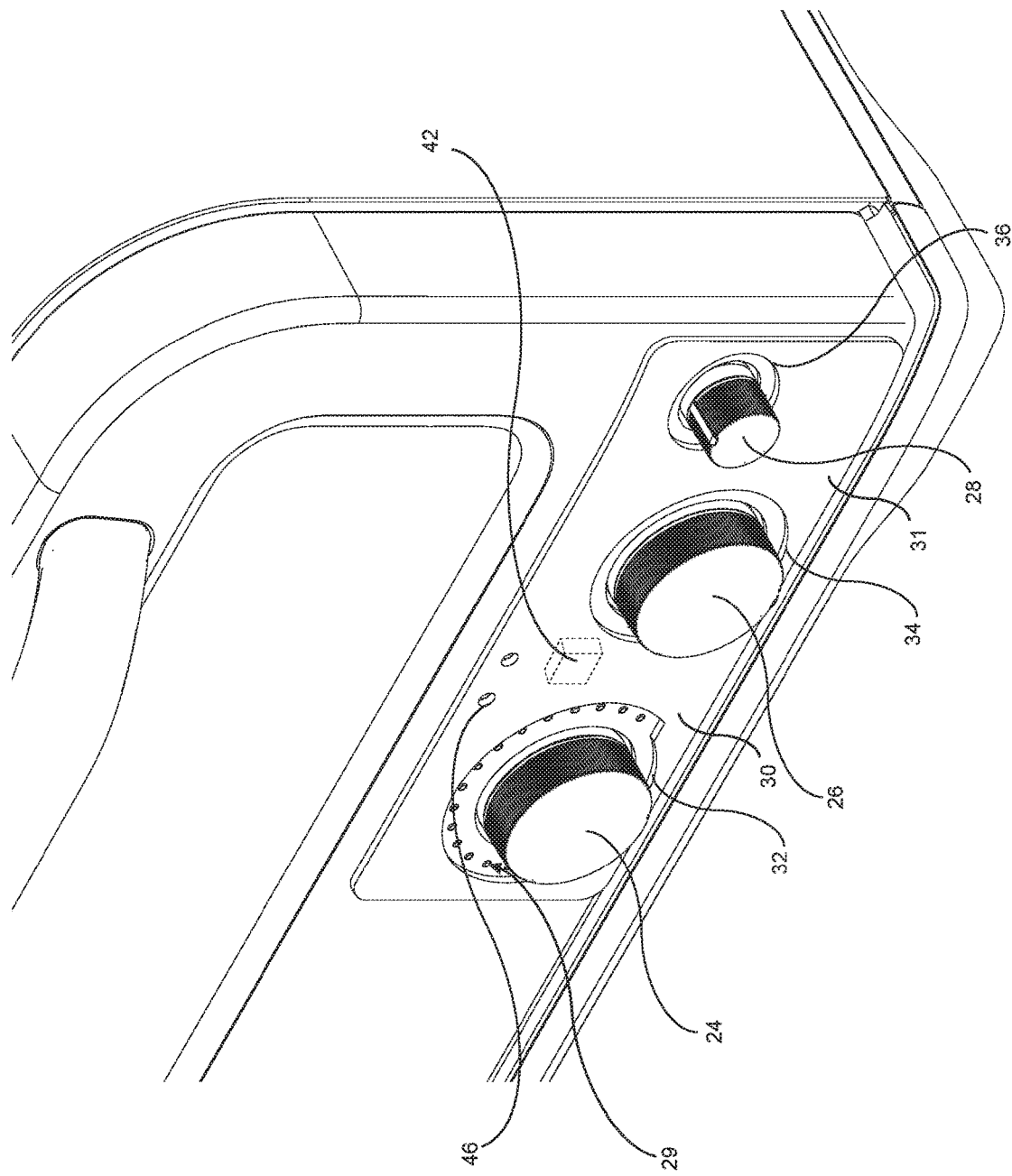
FIG. 6 is a schematic enlarged isometric view of the appliance of FIG. 1, shown with the sensor and the interface coupled together.

With particular reference to FIGS. 5 and 6, the control hub 22 includes a sensor 42 operatively associated with the algorithm 20. In one embodiment, the sensor 42 is configured to detect a magnetic field of the interface 30 and to activate the switch to switch the algorithm 20 from the first mode 38 to the second mode 40 upon the sensor 42 detecting the magnetic field of the interface 30 as the interface 30 is mounted on the front face of the door 18. The sensor 42 typically includes a Hall effect transducer but may be an anisotropic magnetoresistive sensor, a reed switch, or the like. In another embodiment, the sensor 42 may be a light sensor so that, as the interface 30 is mounted on the front face of the door 18, the interface 30 will at least partially block the light sensor to cause the algorithm 20 to switch to the second mode 40. In either embodiment, when the interface 30 is removed from the front face of the door 18, the algorithm 20 is configured to switch back to the first mode 38. In this way, switching of the algorithm 20 between the first mode 38 and the second mode 40 may be performed by attaching and removing the interface 30 to and from the front face of the door 18.

The control hub 22 also includes indicators 44, in the form of LEDs for example, to indicate a state of the cooking cavity 14. Holes 46 are provided on the interface 30 and are sized corresponding to the size of the indicators 44. Alternatively, an elongate aperture 48 (shown in FIG. 3) may be provided on the interface 30 and located corresponding to the positions of the indicators 44.

The appliance 10 may have the advantage that it provides a relatively quick, cost-effective and user-friendly way to switch between multiple operating modes.

The invention claimed is:
1. A cooking appliance including:
a hollow body providing a cooking cavity, the body having an opening via which product to be cooked can be moved relative to the cavity;
a heating element located in the cavity to deliver radiant energy to cook the product;
a controller operatively associated with the heating element to provide for selective delivery of electric power to the heating element to provide a heating profile across the product, with the controller being configured to switch between a first mode and a second mode to alter the electric power to the heating element to vary the heating profile across the product;
a control projecting from the body and operatively associated with the controller to alter the electric power to the heating element in both the first mode and the second mode of the controller;

an interface releasably mounted to the body, with the interface having an opening through which the control projects when the interface is mounted to the body; and wherein the controller is configured to switch from the first mode to the second mode upon mounting the interface to the body, wherein the interface is magnetically attracted to the body so as to be removably mounted thereon, and wherein the body includes a sensor operatively associated with the controller, with the sensor being configured to detect a magnetic field of the interface and to switch the controller from the first mode to the second mode upon the sensor detecting the magnetic field of the interface.

2. The appliance of claim 1, wherein the sensor is a Hall effect transducer.

\* \* \* \* \*